United States Patent
Shinya et al.

(10) Patent No.: US 6,284,066 B1
(45) Date of Patent: Sep. 4, 2001

(54) PROCESS FOR PRODUCING HYDROGEN ABSORBING ALLOY POWDER AND HYDROGEN ABSORBING ALLOY ELECTRODE

(75) Inventors: Naofumi Shinya; Hiroto Sugahara; Masatoshi Ishii, all of Fukui-ken (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

(21) Appl. No.: 09/265,682

(22) Filed: Mar. 10, 1999

(30) Foreign Application Priority Data

Mar. 20, 1998 (JP) .................................. 10-072619

(51) Int. Cl.[7] .............................. B22F 9/04; H01M 4/48
(52) U.S. Cl. ............................................ 148/513; 420/900
(58) Field of Search .................... 148/513, 514; 420/900

(56) References Cited

U.S. PATENT DOCUMENTS

| 5,605,585 | * | 2/1997 | Yamamoto et al. | ................. 148/513 |
| 5,654,115 | * | 8/1997 | Hasebe et al. | ....................... 420/900 |
| 5,840,166 | * | 11/1998 | Kaneko | ................................. 420/900 |
| 5,864,072 | * | 1/1999 | Kobayashi et al. | .................. 148/513 |
| 6,040,087 | * | 3/2000 | Kawakami | ............................ 420/900 |
| 6,136,473 | * | 10/2000 | Furukawa et al. | ................... 420/900 |

FOREIGN PATENT DOCUMENTS

| 51-13934 | 3/1976 | (JP) . |
| 53048918 | 5/1978 | (JP) . |
| 54064014 | 5/1979 | (JP) . |
| 60250558 | 12/1985 | (JP) . |
| 61091862 | 5/1986 | (JP) . |
| 61233969 | 10/1986 | (JP) . |

* cited by examiner

Primary Examiner—George Wyszomierski
(74) Attorney, Agent, or Firm—Henry D. Coleman; R. Neil Sudol; William J. Sapone

(57) ABSTRACT

Provided is an inexpensive process for producing hydrogen absorbing alloy powder suitable for a nickel-metal hydride storage battery having a high rate discharge property, a high capacity and a long cycle life for repetition of charge and discharge. The process comprises a step of an addition of a rare earth metal oxide and/or hydroxide to a hydrogen absorbing alloy powder, a wet or dry mixing step and a thermal treatment step in an inert atmosphere or in a vacuum.

5 Claims, No Drawings

PROCESS FOR PRODUCING HYDROGEN ABSORBING ALLOY POWDER AND HYDROGEN ABSORBING ALLOY ELECTRODE

BACKGROUND OF THE INVENTION

1. Field of the Invention

The present invention relates to a process for producing hydrogen absorbing alloy powder suitable for a negative electrode of an alkaline storage battery, as well as a hydrogen absorbing alloy electrode formed of the hydrogen absorbing alloy powder produced thereby. More specifically, it relates to a process for producing a hydrogen absorbing alloy suitable to the application of a nickel-hydrogen storage battery which excels in properties such as a cycle life and a high rate discharge property.

2. Description of the Related Art

Since a hydrogen absorbing alloy which can charge and discharge hydrogen was discovered, the application thereof has been progressively developed. An alkaline storage battery containing a negative electrode formed of the hydrogen absorbing alloy has been made practicable, and the hydrogen absorbing alloy used for it has been improved one after another.

Although the $LaNi_5$ alloy investigated initially (Japanese Provisional Patent Publication No. 51-13934/1976) has an advantage that the absorbed amount of hydrogen is large, it also has disadvantages such as expensive La metal and a tendency to become impalpable powder in progress of repetition of charge and discharge of hydrogen. Further, it has such a disadvantage that it is easily corroded by an alkaline solution or an acid solution. Accordingly, when said hydrogen absorbing alloy is applied in an alkaline storage battery, despite an high initial capacity, the capacity becomes no more than a half of the initial capacity after the 50 or more times of charge and discharge cycles. Consequently, the hydrogen absorbing alloy has an disadvantage of being incapable of withstanding a longer period of use.

The disadvantages have been improved by substituting a part of La of the $LaNi_5$ alloy by Ce, Pr, Nd or other rare earth elements, and/or by substituting a part of Ni of the $LaNi_5$ alloy by metal such as Co, Al, Mn or the like (Japanese Provisional Patent Publication Nos. 53-48918/1978, 54-64014/1979, 60-250558/1985, 61-91862/1986, and 61-233969/1986).

SUMMARY OF THE INVENTION

The hydrogen absorbing alloy having Mm has an advantage that Mm is inexpensive. As the applications for the hydrogen absorbing alloy have been expanded widely recently, however, the hydrogen absorbing alloy having Mm which also owns a good high rate discharge property has been sought.

In order to improve the high rate discharge property, a surface treatment or alloy (an alkaline treatment or an acid treatment), a plating treatment, or an addition of B (boron), Mo or others have been carried out conventionally. However, it is difficult to maintain the surface activity of the alloy in use of the surface treatment such as the alkaline or the acid treatment, or in the addition of the other element.

Hence, it is the first object of the present invention to provide an inexpensive process for producing hydrogen absorbing alloy powder suitable for a nickel-metal hydride storage battery having a excellent high rate discharge property.

Moreover, it is the second object of the present invention to provide an inexpensive process for producing hydrogen absorbing alloy powder suitable for a nickel-metal hydride storage battery having a higher capacity and a longer cycle life for repetition of charge and discharge, as well as an excellent high rate discharge property.

In above view, the present inventors have studied the problems and found that the cycle life and the high rate discharge property can be improved by adding a rare earth metal oxide and/or hydroxide to a hydrogen absorbing alloy powder, then wet- or dry-mixing them, and subsequently treating thermally in an inert atmosphere or in a vacuum. Thus, the present invention has been completed.

According to the present invention, an ingot of hydrogen absorbing alloy is thermally treated at the temperature of 800 to 1100° C. in an inert atmosphere or in a vacuum, then cooled, and reduced to yield a hydrogen absorbing alloy powder. A rare earth metal oxide or hydroxide is added to the obtained hydrogen absorbing alloy powder, and a wet- or dry-mixed. Then, they are further thermally treated at 100 to 800° C. in an inert atmosphere or in a vacuum. As a result, a storage battery having an excellent high rate discharge property is obtained, since the surface activity of the obtained hydrogen absorbing alloy powder is not damaged by an alkaline electrolyte.

DETAILED DESCRIPTION OF PREFERRED EMBODIMENTS

The present invention relates a process for producing hydrogen absorbing alloy powder, comprising steps of adding a rare earth metal oxide and/or hydroxide to a hydrogen absorbing alloy powder, preferably to the hydrogen absorbing alloy powder obtained by a thermal treatment of an ingot of hydrogen absorbing alloy at the temperature of 800 to 1100° C. in an inert atmosphere or in a vacuum, then cooling, and pulverization; mixing the resultant in a wet or dry manner; and then further thermally treating the mixture in an inert atmosphere or in a vacuum.

Compositions or preparation methods for hydrogen absorbing alloy which can be used in the present invention are not particularly limited. It is preferably the intermetallic compound represented stoichiometrically by $LaNi_5$, wherein a part of La is substituted by Ce, Pr, Nd or the other rare earth element and a part of Ni is substituted by Co, Mn, Al or the other element such as Fe, Cu, Si, Ti, Mo or Zr. In view of improving the cycle life, it is more preferable to substitute at least a part of Ni by Mn, further more preferable to substitute at least a part of Ni by Mn and Co.

According to the present invention, the hydrogen absorbing alloy having the said compositions can be used. And $MmNi_5$-type hydrogen absorbing alloy having the following composition is preferably used. It is represented specifically by the general formula, $(R)_n(Ni)_{5-x-y-z}(Mn)_x(Al)_y(Co)_z$, wherein R is La or a mixture of La and at least one rare earth element (selected from Ce, Pr, Nd or the like); n, x, y and z are each a positive number which represents an atomic ratio; and n is between 0.93 and 1.06, and x, y and z each satisfies $0<x\leq0.6$, $0<y\leq0.6$ and $0<z\leq1.0$.

Furthermore, other than the above composition, the compositions having a part of Ni substituted by Fe, Si, Cu, Mo, Ti, Zr or the like may be used. Among them, the compositions having 20% by weight or more of La in R are more preferable.

Although the preparation method for the ingot of hydrogen absorbing alloy is not limited, the casting of the liquid having each of metal components melted is preferable because of lower cost. Even when other methods including a roll rapid quenching method and an atomization method are used, the hydrogen absorbing alloys obtained may bring the same effects as or better effects than those obtained from the casting.

According to the present invention, the ingot of hydrogen absorbing alloy may be thermally treated. Although any one of the known methods of thermal treatments may be selectively used, it is preferable to use the treatment at 800 to 1100° C. for 5 to 20 hours in resistance-type furnace in a vacuum or in an inert atmosphere such as argon, helium or the like. The thermal treatment effects the removal of segregation and strain of metals in the alloy. If the temperature is less than 800° C., the removal of segregation of metals in the alloy may not be enough. If the temperature is more than 1100° C., the discrepancy in the composition may take place since metals having higher vapor pressures such as Mn come out. Accordingly, the temperature range of 800 to 1100° may be used.

The atmosphere of an inert gas such as argon or helium is used for eliminating the contamination by impurities such as oxygen. Accordingly, as long as the contamination is eliminated, any other methods may be used. That is, it is not limited to the inert atmosphere. A vacuum may be used in the same reason and not limited to the vacuum in the strict sense in the same reason. The "in a vacuum" is generally under the pressure of about $10^{-4}$ Torr.

The ingot of hydrogen absorbing alloy obtained in the above-mentioned methods is reduced to a powder with the average particle diameter 5 to 10 $\mu$m, preferably 15 to 60 $\mu$m to by a hydration milling or a milling using a ball mill, a jet mill, a pulvelizer or the like.

The present invention provides a method for forming islands of rare earth metal oxide and/or hydroxide on the surface of the alloy described above and also forming a nickel-rich layer having a higher Ni concentration than the mother phase, and/or a cobalt-rich layer having a higher Co concentration than the mother phase within 500 nm in the depth from the surface of the alloy. In a specific method, rare earth metal oxide and/or hydroxide which has a lower oxidation-reduction potential than both of Co and Ni and which has an oxidation-reduction potential of –2.0V or more may be added to the hydrogen absorbing alloy powder.

Oxide and/or hydroxide of a metal such as Cu or Pb having a higher oxidation-reduction potential than both of Co and Ni, may unpreferably increase the elution of Co and the like.

Rare earth metal oxide or hydroxide may be used alone or as a mixture thereof according to the present invention. Oxide and/or hydroxide of rare-earth metal selected from the group consisting of La, Ce, Pr, Nd, Sm, Eu, Gd, Tb, Dy, Ho, Er, Tm, Yb, Lu and Y may be used. The metal oxide and hydroxide may be commonly expressed by the general formulae $R''_2O_3$ and $R''(OH)_3$, respectively, wherein $R''$ represents a rare earth element. However, the metal oxide and hydroxide are not limited to those of general formulas and include others which are not represented by the general formulas.

The examples includes $La_2O_3$, $CeO_2$, $Pr_6O_{11}$, $Nd_2O_3$, $Sm_2O_3$, $Eu_2O_3$, $Gd_2O_3$, $Tb_4O_3$, $Dy_2O_3$, $Ho_2O_3$, $Er_2O_3$, $Tm_2O_3$, $Yb_2O_3$, $Lu_2O_3$, $Y_2O_3$, $La(OH)_3$, $Ce(OH)_3$, $Pr(OH)_3$, $Nd(OH)_3$, $Sm(OH)_3$, $Eu(OH)_3$, $Gd(OH)_3$, $Tb(OH)_3$, $Dy(OH)_3$, $Ho(OH)_3$, $Er(OH)_3$, $Tm(OH)_3$, $Yb(OH)_3$, $Lu(OH)_3$, $Y(OH)_3$.

Oxide or hydroxide of rare earth metal selected from Gd, Ho, Er, Yb and Y may be more preferably used.

In this specification, rare earth metal oxide includes compound oxide of rare earth metals and rare earth metal hydroxide includes compound hydroxide of rare earth metals. That is, the rare earth metal oxide or hydroxide may be compound oxide or hydroxide composed of two or more rare earth elements. Compound oxide or hydroxide composed of two or more rare earth elements selected from the group consisting of Gd, Ho, Er, Yb and Y may be preferable.

According to the present invention, compound oxide and/or hydroxide, a combination of the rare earth metal oxide and/or hydroxide describe above may be used. The compound oxide or hydroxide is not a mixture of metal oxides or hydroxides but a solid solution wherein metal oxides or hydroxides are solution-treated. For example, it is expressed by the general formula $(R^1)_a \cdot (R^2)_b$ or $(R^1)_c \cdot (R^2)_d \cdot (R^3)_e$, using two or more of rare earth metal oxides or hydroxides described above. In the general formula, $R^1$, $R^2$ and $R^3$ each is said rare earth metal oxide or hydroxide; a and b each is a number between 0.1 and 0.9 with a proviso that a+b=1; c,d,e each is a number between 0.1 and 0.8 with a proviso that c+d+e=1.

Preferable examples includes $(Yb_2O_3)_a \cdot (Lu_2O_3)_b$, $(Yb_2O_3)_a \cdot (Er_2O_3)_b$, $(Er_2O_3)_a \cdot (Dy_2O_3)_b$, $(Yb_2O_3)_c \cdot (Sm_2O_3)_d \cdot (Gd_2O_3)_e$, $(Y_2O_3)_c \cdot (Er_2O_3)_d \cdot (Yb_2O_3)_e$, $(Yb(OH)_3)_a \cdot (Er(OH)_3)_b$, $(Er(OH)_3)_a \cdot (Dy(OH)_3)_b$.

According to the present invention, a mixture of said oxides and/or hydroxides may be used. And other than oxides and/or hydroxides of said rare earth metals, oxide or hydroxide of the metal such as Mn, Al, V, Nb, Hf, Fe or Si which has lower oxidation-reduction potential than both of Co and Ni may be used.

Rare earth metal oxide and/or hydroxide (including compound oxide and/or compound hydroxide) is added in the total amount of 0.1 to 20% by weight, preferably 0.1 to 10% by weight, more preferably 0.1 to 2% by weight to the hydrogen absorbing alloy. If less than 0.1% by weight to the alloy is added, the resulting hydrogen absorbing alloy may worsen corrosion resistance, hydrogen chargability and dischargability, or cycle life. If more than 20% by weight to the alloy is added, thermal conduction or electric conduction may be worsened since the contacts among the resulting alloys are decreased, so that the production cost may also be increased.

According to the present invention, following the addition of rare earth metal oxide and/or hydroxide, the resultant is wet-mixed or dry-mixed, and then thermally treated in an inert atmosphere or in a vacuum to yield the alloy having islands of rare metal oxide or hydroxide on the surface thereof.

Mixing the rare-metal oxide or hydroxide with the hydrogen absorbing alloy is done in a wet or dry manner. In the wet-mixing, water, hexane, acetone or the like may be added to the mixture of the alloy powder and the rare earth metal oxide and/or hydroxide to be stirred in a preferable period of 0.1 to 2 hours. In the dry-mixing, the alloy powder and rare earth metal oxide and/or hydroxide may be stirred for 0.1 to 2 hours in an inert atmosphere such as argon or helium or in a vacuum.

According to the present invention, following the addition and mixing of rare earth metal oxide and/or hydroxide, the thermal treatment takes place at the temperature of 100 to 800° C., preferably 200 to 500° C., in an inert atmosphere of argon, helium or the like or in a vacuum (about $1 \times 10^{-4}$ Torr) or in mixed gases of an inert gase and a small amount of $H_2O$. Accordingly, the rare earth metal oxide or hydroxide is attached strongly to the alloy surface, forming islands on the alloy surface. Hence, the metal oxide or hydroxide is not incorporated into the binder from the alloy surface in the pasting step, staying on the alloy surface unlike what is obtained without the thermal treatment. Accordingly, when it is used as a negative electrode, the corrosion resistance is enhanced since the rare earth metal oxide or hydroxide stays on the alloy surface.

If the temperature is less than 100° C., the formation of the Ni-rich or Co-rich layer on the alloy surface may not be enough, and if the temperature is more than 800° C., oxidation of the alloy surface may go on to make the alloy surface inert. Accordingly, the thermal treatment is carried out between 100 and 800° C.

The reason why an inert gas atmosphere such as argon, helium or the like, or a vacuum is used is same as described above. Accordingly, any method in which the requirement can be satisfied can be used without limiting the inert gas atmosphere such as argon or the vacuum.

The binder for producing an electrode, which is added to the obtained hydrogen absorbing alloy powder having islands of rare earth oxide or hydroxide on the surface thereof, is not particularly limited. The binder may be suitably selected from the group consisting of polyvinyl alcohol, celluloses such as methyl cellulose, carboxymethyl cellulose and the like and organic binder such as PTFE, polyethylene oxide, polymeric latex and the like, and may be used alone or as a mixture thereof. The binder in the amount of 0.1 to 20% by weight to the alloy powder is added.

According to the present invention, a conductor which will be filled with a mixture of the alloy and the binder or which a mixture of the alloy and the binder is applied to, is not particularly limited. The conductor may be selected suitably from the group consisting of a three-dimensional conductor such as nickel fibers, foamed nickel or the like, and a two-dimensional conductor such as punched metal or the like.

The hydrogen absorbing alloy electrode may be produced as follows. The hydrogen absorbing alloy powder treated according to the present invention is added to the aqueous solution containing said binder and kneaded to prepare the paste. The resulting paste is applied to the surface of the conductor and dried, and pressed to yields a hydrogen absorbing alloy electrode. In another process, the paste is molded to a sheet, which is pressed to the conductor surface to yield a hydrogen absorbing alloy electrode.

The present invention will be described further in details using Examples. However, the present invention is not constrained to these examples.

EXAMPLES 1 AND 2

Ni, Co, Mn and Al each was weighed so as to be 3.70, 0.80. 0.20 and 0.30 in the atomic ratio, respectively, to 1.00 (atomic ratio) of the combination of La 80% by weight and Pr 20% by weight (the combination with 20% of La substituted by Pr). They were combined and melted in a high-frequency melting furnace. Then, they were cooled to yield the alloy of the $LaNi_5$ group.

The obtained alloy was subjected to a heat treatment in an Ar atmosphere at 900° C. for 5 hours, and pulverized so as to produce hydrogen absorbing alloy powder with the average particle diameter of 40 $\mu$m. And 0.3 weight parts of $Yb_2O_3$ (Ex.1) or $Er_2O_3$ (Ex.2) was added to 100 weight parts of the obtained alloy powder. After an addition of 100 ml water per 100 g of the alloy power, the resulting mixture was wet-mixed for 30 minute, filtered, dried and finally, treated thermally at the temperature of 250° C. for 1 hour in a vacuum. To 16 g of the obtained hydrogen absorbing alloy was added 4 g of aqueous 3% by weight PVA solution. Mixing them produced a paste. A foamed porous body of nickel with porosity of 95% was filled uniformly with the paste, and then pressed to yield a sheet with a thickness of 0.5 to 1.0 mm. The sheet was furnished with a lead on the surface to obtain a negative electrode. A known foamed metal type of nickel having a capacity of 2400 mAh was used as a positive electrode.

The obtained sheet of the negative electrode was wrapped to the positive electrode through a separator formed of a polypropylene nonwoven fabric which had been subjected to a known hydrophilic treatment. The wrapped electrodes were placed in a cylindrical vessel, where an electrolytic solution of aqueous 6N KOH solution was added. Then, the vessel was sealed to yield a SC-sized and sealed nickel-hydrogen storage battery. The obtained battery was subjected at the constant temperature of 20° C. to the cycle of charge at 720 mA for 4 hours and discharge at 720 mA until the battery voltage became 1.0 V. After this cycle was repeated 10 times, the battery was charged at 720 mA at 20° C. and discharged at 2400 mA until the battery voltage became 1.0 V.

The "retention percentage (%)" of discharge capacity for 720 mA and 2400 mA was thus obtained as shown in Table 1. The "retention percentage (%)" is a ratio of the discharge capacity at 2400 mA to the discharge capacity at 720 mA, being expressed in percentage. Repeating cycles of charge at 720 mA at 4 hours and discharge at 720 mA until the battery voltage being 1.0, the number of the cycles at which the capacity reached 60% of the initial capacity was recorded as "cycle life".

EXAMPLES 3 AND 4

Ni, Co, Mn and Al each was weighed so as to be 3.70, 0.70. 0.30 and 0.30 in the atomic ratio, respectively, to 0.95 (atomic ratio) of the combination of La 60% by weight and Pr 40% by weight (the combination with 40% of La substituted by Pr). They were combined, melted and went through the same procedure as described in Example 1 to produce hydrogen absorbing alloy powder with the average particle diameter of 40 $\mu$m. After an addition of 0.5 weight parts of $Gd_2O_3$ (Ex.3) or $Dy_2O_3$ (Ex.4) to 100 weight parts of the obtained alloy powder and a dry-mixing, the thermal treatment was carried out at 400° C. in an Ar atmosphere for 1 hour. To 16 g of the obtained hydrogen absorbing alloy was added 4 g of aqueous 3% by weight PVA solution. Mixing them produced a paste. A foamed porous body of nickel with porosity of 95% was filled uniformly with the paste, and then pressed to yield a sheet with a thickness of 0.5 to 1.0 mm. The sheet was furnished with a lead on the surface to obtain a negative electrode. The following procedure was same as described in Example 1.

EXAMPLES 5 AND 6

Ni, Co, Mn and Al each was weighed so as to be 4.00, 0.50. 0.20 and 0.30 in the atomic ratio, respectively, to 1.02 (atomic ratio) of the combination of La 70% by weight and Nd 30% by weight (the combination with 30% of La substituted by Nd). They were combined, melted and went through the same procedure as described in Example 1 to produce hydrogen absorbing alloy powder with the average particle diameter of 40 $\mu$m. After an addition of 1.0 weight parts of $Pr_6O_{11}$ (Ex.5) or $La_2O_3$ (Ex.6) to 100 weight parts of the obtained alloy powder and a dry-mixing, the thermal treatment was carried at 500° C. in an Ar atmosphere for 1 hour. To 16 g of the obtained hydrogen absorbing alloy was added 4 g of aqueous 3% by weight PVA solution. Mixing them produced a paste. A foamed porous body of nickel with porosity of 95% was filled uniformly with the paste, and then pressed to yield a sheet with a thickness of 0.5 to 1.0 mm. The sheet was furnished with a lead on the surface to obtain a negative electrode. The following procedure was same as described in Example 1.

EXAMPLES 7 AND 8

Ni, Co, Mn and Al each was weighed so as to be 3.80, 0.70. 0.40 and 0.30 in the atomic ratio, respectively, to 0.98 (atomic ratio) of the combination of La 80% by weight and Ce 20% by weight (the combination with 20% of La substituted by Pr). They were combined, melted and went through the same procedure as described in Example 1 to produce hydrogen absorbing alloy powder with the average particle diameter of 40 μm. After an addition of 1.0 weight parts of $Yb_2O_3$ (Ex.7) or $Er_2O_3$ (Ex.8) to 100 weight parts of the obtained alloy powder and a dry-mixing, the thermal treatment was carried out at 400° C. in an Ar atmosphere for 1 hour. To 16 g of the obtained hydrogen absorbing alloy was added 4 g of aqueous 3% by weight PVA solution. Mixing them produced a paste. A foamed porous body of nickel with porosity of 95% was filled uniformly with the paste, and then pressed to yield a sheet with a thickness of 0.5 to 1.0 mm. The sheet was furnished with a lead on the surface to obtain a negative electrode. The following procedure was same as described in Example 1.

EXAMPLES 9 AND 10

Ni, Co, Mn and Al each was weighed so as to be 3.80, 0.70. 0.40 and 0.30 in the atomic ratio, respectively, to 0.98 (atomic ratio) of the combination of La 80% by weight and Ce 20% by weight (the combination with 20% of La substituted by Pr). They were combined, melted and went through the same procedure as described in Example 1 to produce hydrogen absorbing alloy powder with the average particle diameter of 40 μm. After an addition of 0.5 weight parts of a mixture with 2:1 of a weight ratio of $Yb_2O_3$ to $MnO_2$ (Ex.9) or 0.5 weight parts of a mixture with 2:1 of a weight ratio of $Er_2O_3$ to $MnO_2$ (Ex.10), respectively to 100 weight parts of the obtained alloy powder and a dry-mixing, the thermal treatment was carried out at 200° C. in an Ar atmosphere containing 10% by weight of $H_2O$ vapor (Ar:$H_2O$=9:1) for 1 hour. To 16 g of the obtained hydrogen absorbing alloy was added 4 g of aqueous 3% by weight PVA solution. Mixing them produced a paste. A foamed porous body of nickel with porosity of 95% was filled uniformly with the paste, and then pressed to yield a sheet with a thickness of 0.5 to 1.0 mm. The sheet was furnished with a lead on the surface to obtain a negative electrode. The following procedure was same as described in Example 1.

EXAMPLES 11 AND 12

Ni, Co, Mn and Al each was weighed so as to be 3.80, 0.70. 0.40 and 0.30 in the atomic ratio, respectively, to 0.98 (atomic ratio) of the combination of La 80% by weight and Ce 20% by weight (the combination with 20% of La substituted by Pr). They were combined, melted and went through the same procedure as described in Example 1 to produce hydrogen absorbing alloy powder with the average particle diameter of 40 μm. After an addition of 0.5 weight parts of a mixture with 2:1 of a weight ratio of $Yb_2O_3$ to $Pr_6O_{11}$ (Ex.11) or 0.5 weight parts of a mixture with 2:1 of a weight ratio of $Y_2O_3$ to $Nd_2O_3$ (Ex.12), respectively to 100 weight parts of the obtained alloy powder and a dry-mixing in an Ar atmosphere, the thermal treatment was carried out at 400° C. in an Ar atmosphere containing 10% by weight of $H_2O$ vapor (Ar:$H_2O$=9:1) for 1 hour. To 16 g of the obtained hydrogen absorbing alloy was added 4 g of aqueous 3% by weight PVA solution. Mixing them produced a paste. A foamed porous body of nickel with porosity of 95% was filled with the paste, and then pressed to yield a sheet with a thickness of 0.5 to 1.0 mm. The sheet was furnished with a lead on the surface to obtain a negative electrode. The following procedure was same as described in Example 1.

EXAMPLES 13 TO 16

Ni, Co, Mn and Al each was weighed so as to be 3.70, 0.70. 0.30 and 0.30 in the atomic ratio, respectively, to 0.98 (atomic ratio) of the combination of La 60% by weight and Nd 40% by weight (the combination with 40% of La substituted by Nd). They were combined, melted and went through the same procedure as described in Example 1 to produce hydrogen absorbing alloy powder with the average particle diameter of 40 μm. After an addition of 0.5 weight parts of $Er(OH)_3$ (Ex.13), $Dy(OH)_3$ (Ex.14), $La(OH)_3$ (Ex.15) or $Gd(OH)_3$ (Ex.16) to 100 weights parts of the obtained alloy powder and dry-mixing in an Ar atmosphere, the thermal treatment was carried out at 400C in an Ar atmosphere for 1 hour. To 16 g of the obtained hydrogen absorbing alloy was added 4 g of aqueous 3% by weight PVA solution. Mixing them produced a paste. A foamed porous body of nickel with porosity of 95% was filled with the paste, and then pressed to yield a sheet with a thickness of 0.5 to 1.0 mm. The sheet was furnished with a lead on the surface to obtain a negative electrode. The following procedure was same as described in Example 1.

EXAMPLE 17

Ni, Co, Mn and Al each was weighed so as to be 3.80, 0.70. 0.40 and 0.30 in the atomic ratio, respectively, to 0.98 (atomic ratio) of the combination of La 80% by weight and Ce 20% by weight (the combination with 20% of La substituted by Ce). They were combined, melted and went through the same procedure as described in Example 1 to produce hydrogen absorbing alloy powder with the average particle diameter of 40 μm. After an addition of 0.5 weight parts of a mixture with 1:1 of a weight ratio of $Yb(OH)_3$ to $MnO_2$ to 100 weight parts of the obtained alloy powder and a dry-mixing in an Ar atmosphere, the thermal treatment was carried out at 350° C. in an Ar atmosphere containing 10% by weight of $H_2O$ vapor (Ar:$H_2O$=9:1) for 1 hour. To 16 g of the obtained hydrogen absorbing alloy obtained was added 4 g of aqueous 3% by weight PVA solution. Mixing them produced a paste. A foamed porous body of nickel with porosity of 95% was filled with the paste, and then pressed to yield a sheet with a thickness of 0.5 to 1.0 mm. The sheet was furnished with a lead on the surface to obtain a negative electrode. The following procedure was same as described in Example 1.

EXAMPLES 18 TO 21

Ni, Co, Mn and Al each was weighed so as to be 3.70, 0.70. 0.30 and 0.30 in the atomic ratio, respectively, to 0.95 (atomic ratio) of the combination of La 60% by weight and Pr 40% by weight (the combination with 40% of La substituted by Pr). They were combined, melted and went through the same procedure as described in Example 1 to produce hydrogen absorbing alloy powder with the average particle diameter of 40 μm. After an addition of 0.2 weight parts (Ex.18), 5.0 weight parts (Ex.19), 15 weight parts (Ex.20), 20 weight parts (Ex.21) or 25 weight parts (Ex.21)

of $Yb_2O_3$ to 100 weight parts of the obtained alloy powder and a dry-mixing in an Ar atmosphere, the thermal treatment was carried out at 350° C. in an Ar atmosphere for 1 hour. To 16 g of the obtained hydrogen absorbing alloy was added 4 g of aqueous 3% by weight PVA solution. Mixing them produced a paste. A foamed porous body of nickel with porosity of 95% was filled with the paste, and then pressed to yield a sheet with a thickness of 0.5 to 1.0 mm. The sheet was furnished with a lead on the surface to obtain a negative electrode. The following procedure was same as described in Example 1.

Comparative Examples 1 to 4

The alloy of Example 1 was used and went through the same procedure as Example 1, except the changed treatment conditions shown in Table 1.

Surface Analyses

Surface analyses of the hydrogen absorbing powder obtained in Examples 1 to 21 were carried out using AES (Auger electron spectroscopy) and TEM (transmission electron microscope). The AES analysis showed that islands of metal oxide or hydroxide and the Ni-rich layer having a higher concentration of nickel than the mother phase existed on the surface of the alloy. The TEM analysis showed that the Co-rich layer having a higher concentration of cobalt than the mother phase existed on the surface of the alloy. The metal oxide and hydroxide were identified by X-ray powder diffraction analysis.

TABLE 1

| | Additive | Added Amount* (wt %) | Treatment Condition | 720 mA Discharge Capacity (mAh) | 2400 mA Discharge Capacity (mAh) | Retention Percentage (%) | Cycle Life |
|---|---|---|---|---|---|---|---|
| Example 1 | $Yb_2O_3$ | 0.3 | vacuum 250° C. | 2400 | 1600 | 66.7 | 700 |
| Example 2 | $Er_2O_3$ | 0.3 | vacuum 250° C. | 2400 | 1700 | 70.8 | 715 |
| Example 3 | $Gd_2O_3$ | 0.5 | Ar 400° C. | 2400 | 1500 | 62.5 | 650 |
| Example 4 | $Dy_2O_3$ | 0.5 | Ar 400° C. | 2400 | 1500 | 62.5 | 700 |
| Example 5 | $Pr_6O_{11}$ | 1.0 | Ar 500° C. | 2400 | 1400 | 58.3 | 650 |
| Example 6 | $La_2O_3$ | 1.0 | Ar 500° C. | 2400 | 1400 | 58.3 | 600 |
| Example 7 | $Yb_2O_3$ | 1.0 | Ar 400° C. | 2400 | 1500 | 62.5 | 720 |
| Example 8 | $Er_2O_3$ | 1.0 | Ar 400° C. | 2400 | 1600 | 66.7 | 700 |
| Example 9 | $Yb_2O_3$ $MnO_2$ | 0.5 | Ar 200° C. | 2400 | 1500 | 62.5 | 650 |
| Example 10 | $Er_2O_3$ $MnO_2$ | 0.5 | Ar 200° C. | 2400 | 1500 | 62.5 | 650 |
| Example 11 | $Y_2O_3$ $Pr_6O_{11}$ | 0.5 | vacuum 300° C. | 2400 | 1400 | 58.3 | 700 |
| Example 12 | $Y_2O_3$ $Nd_2O_3$ | 0.5 | vacuum 300° C. | 2400 | 1400 | 58.3 | 650 |
| Example 13 | $Er(OH)_3$ | 0.5 | Ar 400° C. | 2400 | 1500 | 62.5 | 650 |
| Example 14 | $Dy(OH)_3$ | 0.5 | Ar 400° C. | 2400 | 1500 | 62.5 | 620 |
| Example 15 | $La(OH)_3$ | 0.5 | Ar 400° C. | 2400 | 1400 | 58.3 | 600 |
| Example 16 | $Gd(OH)_3$ | 0.5 | Ar 400° C. | 2400 | 1600 | 66.7 | 650 |
| Example 17 | $Yb(OH)_3$ $MnO_2$ | 0.5 | Ar 350° C. | 2400 | 1500 | 62.5 | 700 |
| Example 18 | $Yb_2O_3$ | 0.2 | Ar 350° C. | 2400 | 1600 | 66.7 | 680 |
| Example 19 | $Yb_2O_3$ | 5.0 | Ar 350° C. | 2400 | 1500 | 62.5 | 730 |
| Example 20 | $Yb_2O_3$ | 15.0 | Ar 350° C. | 2400 | 1450 | 60.4 | 735 |
| Example 21 | $Yb_2O_3$ | 20.0 | Ar 350° C. | 2400 | 1400 | 58.3 | 740 |
| Com. Ex. 1 | — | — | untreated | 2400 | 850 | 35.4 | 450 |
| Com. Ex. 2 | $Yb_2O_3$ | 0.5 | Ar 850° C. | 2400 | 1500 | 62.5 | 200 |
| Com. Ex. 3 | $Yb_2O_3$ | 0.5 | Ar 80° C. | 2400 | 850 | 35.4 | 400 |
| Com. Ex. 4 | $Yb_2O_3$ | 1.0 | untreated | 2400 | 850 | 35.4 | 720 |

*"Added amount (wt %)" is a weight % to the alloy.

What is claimed is:

1. Process for producing a hydrogen absorbing alloy powder comprising an addition step of a rare earth metal oxide and/or hydroxide to a hydrogen absorbing alloy powder, a wet or dry mixing step, and a thermal treatment step at 100 to 800° C. in an inert atmosphere or in a vacuum.

2. Process for producing a hydrogen absorbing alloy powder according to claim 1 wherein said hydrogen absorbing powder before the addition of the rare earth metal oxide and/or hydroxide is obtained starting from an ingot of hydrogen absorption alloy through steps comprising a thermal treatment at 800 to 1100° C. in an inert atmosphere or in a vacuum, a cooling step, and then a milling step.

3. Process for producing a hydrogen absorbing alloy powder according to claim 1 wherein said hydrogen absorbing powder before the addition of the rare earth metal oxide and/or hydroxide is represented by a general formula $(R)_n (Ni)_{5-x-y-z}(Mn)_x(Al)_y(Co)_z$ wherein R is La alone or a mixture of La and one or more rare earth elements other than La, and n, x, y and z are positive numbers denoting atomic ratios and satisfying the relationship $0.93 \leq n \leq 1.06$, $0 < x \leq 0.6$, $0 < y \leq 0.6$ and $0 < z \leq 1.0$.

4. Process for producing a hydrogen absorbing alloy powder according to claim 1 wherein said rare earth metal oxide and/or hydroxide is added in an amount of 0.1 to 20% by weight of the hydrogen absorbing alloy.

5. Process for producing a hydrogen absorbing alloy powder according to claim 1 wherein said rare earth metal oxide and/or hydroxide is oxide and/or hydroxide of at least one selected from the group consisting of Gd, Ho, Er, Yb and Y, or compound oxide and/or compound hydroxide of at least two selected from said group.

* * * * *